United States Patent [19]

Buchwalter et al.

[11] Patent Number: 5,357,005
[45] Date of Patent: * Oct. 18, 1994

[54] REACTIVE SURFACE FUNCTIONALIZATION

[75] Inventors: Stephen L. Buchwalter, Hopewell Junction; Charles R. Davis, Endicott; Ronald D. Goldblatt, Rye Brook; Richard R. Thomas, Fishkill, all of N.Y.

[73] Assignee: International Business Machines Corporation, Armonk, N.Y.

[*] Notice: The portion of the term of this patent subsequent to May 28, 2008 has been disclaimed.

[21] Appl. No.: 805,213

[22] Filed: Dec. 11, 1991

[51] Int. Cl.$^5$ .................. C08F 20/00; C08F 283/04; B05D 3/04; C08L 77/06

[52] U.S. Cl. .................. 525/436; 156/272.6; 156/307.1; 156/633; 204/192.36; 252/79.1; 427/307; 428/473.5; 525/330.5; 525/326.2; 525/437; 525/438; 525/420; 525/440; 525/454; 525/457

[58] Field of Search ............ 525/420, 476, 438, 330.3, 525/330.5, 331.5, 331.6, 331.2, 332.3, 326.6, 329.1, 326.2, 333.6, 333.1, 440, 454, 457, 437; 156/643, 272.6, 307.1, 308.2, 633, 646; 204/192.36; 252/79.1; 427/307; 428/473.5

[56] References Cited

U.S. PATENT DOCUMENTS 5,019,210  5/1991  Chou et al. .................. 156/643

Primary Examiner—John Kight, III
Assistant Examiner—T. Mosley
Attorney, Agent, or Firm—Rosen, Dainow & Jacobs

[57] ABSTRACT

Method for treating surface of dielectric polymer with water vapor plasma to form reactive sites and grafting a reactive polymer thereto to tailor the properties of the dielectric polymer surface.

35 Claims, No Drawings

REACTIVE SURFACE FUNCTIONALIZATION

DESCRIPTION

1. Technical Field

The invention relates to an electronic packaging application, and particularly to method of functionalizing the surface of dielectric polymer insulators generally used as a substrate in electronic packaging applications to render the surface of the polymer substrate reactive while leaving the bulk characteristics of the substrate unchanged.

2. Prior Art

For many electronic packaging applications, it is desirable to use certain polymeric materials as dielectric insulators because of their excellent bulk characteristics (i.e. the dielectric constant, water uptake properties, thermal stability, mechanical properties, etc.) In the past, difficulties associated with the surface characteristics of these materials were often encountered. Such difficulties included insufficient adhesive bond strength and bond durability and the inability to seed and metallize the surface.

One way to overcome undesirable surface characteristics while preserving the desirable bulk strength properties of the substrate is to modify its surface either chemically or physically while leaving the bulk characteristics of the material intact.

U.S. Pat. No. 5,019,210 to Goldblatt et al. discloses a method for treating a polymer surface with a water vapor plasma to promote the adhesion of the treated polymer surface to a second polymer surface. The present invention on the other hand treats a polymer surface with a water vapor plasma thereby causing the surface to be chemically reactive. The treated polymer surface is then reacted with selected compositions that provide a desirable layer on the surface thereof.

There are a number of other references in the prior art that might be applied to functionalization of a substrate surface.

U.S. Pat. No. 3,676,190 to Landler et al. discloses a process for making substantially pure graft polymers by exposing the polymer to ozone at a temperature not exceeding 130° C. to form an "ozonized" polymer which then reacts with an ethylenically unsaturated monomer. This is a different process than is embodied in the present invention since the ozone utilized in the reference is not equivalent to water vapor plasma as used in the present invention and the ethylenically unsaturated monomer of the reference is not equivalent to the grafting reactant compositions used in the present invention.

U.S. Pat. Nos. 3,759,954, 3,879,422 and 3,956,317 all relate to diepoxide compositions and merely disclose the diepoxides and not the method embodied in the present invention.

U.S. Pat. No. 4,078,096 to Redmond et al. discloses a method for generation of circuit patterns on a polyimide substrate by first preconditioning the substrate surface with a hydrazine solution, then depositing a catalyst on the surface-treated polymer, and exposing the polymer with the catalyst thereon to a bath having metal therein capable of deposition electrolessly on the catalyst containing polymer. While this patent relates to seeding and plating it does not disclose the surface functionalization with water vapor plasma and grafting reactant compositions such as is embodied in the present invention.

U.S. Pat. No. 4,400,424 to Hatada et al. relates to induced dye susceptibility for fabric fibers via recess formation in the fiber and is relevant only to the extent that it utilizes a cold plasma. The method disclosed therein has no direct relevance to the present invention.

U.S. Pat. 4,410,586 to Ladizescky et al. discloses a method of producing a composite material in which a reinforcing material such as fibers is embedded in a matrix material. The reference discloses that the reinforcement material is plasma treated prior to incorporation into the matrix preferably to produce pitting in its surface thereby yielding adhesion and matrix compatibility. This reference is also not relevant to the present invention.

U.S. Pat. No. 4,637,851 to Ueno et al. discloses a method of preparing a matrix pre preg Laminate to form a fabric sheet which is pre-treated by exposure to a low temperature plasma generated in an atomosphere of a gas such as a blend of oxygen and nitrogen under a reduced pressure. This reference also is not relevant to the present invention.

U.S. Pat. No. 4,664,936 also to Ueno et al. discloses a resin impregnated composite pre-preg based on a fabric material of an aromatic polyamide fiber also exposed to a low temperature plasma. The patent states that the adhesive bonding strength between the binder and fiber surface an be increased when the plasma treated fabric material is brought into contact with an unsaturated compound polymerizable by free radical polymerization. While this method has certain similarities to the present invention, it also utilizes oxygen which is not equivalent to water vapor plasma of the present invention and also uses unsaturated ethylenic monomers which are not equivalent to the diepoxides of the present invention.

U.S. Pat. No. 4,705,720 to Kundinger et al. relates to a multi-layer laminate. It discloses polyimides but does not disclose the method of rendering the surface reactive such as is found in the present invention.

SUMMARY OF THE INVENTION

The present invention provides a means of modifying the surface properties of a polymer used as a dielectric insulating substrate while leaving the bulk characteristics thereof unchanged. The method utilized in accordance with the present invention is to initially functionalize the surface of the substrate polymer, preferably a polyimide, as a result of contacting same with a water vapor plasma treatment. Thereafter, the reactive surface of the water vapor plasma treated polymer is contacted with a reactive composition that can be grafted thereon.

DETAILED DESCRIPTION OF THE PREFERRED EMBODIMENT OF THE INVENTION

The stable surface properties that make the polymeric materials desirable for use in electronic packaging applications, also present a problem because of the insufficient adhesive bond strength and bond durability and the inability to seed and metallize. This very stable surface property can be modified by subjecting the substrate, to a treatment with low temperature plasma generated in an atmosphere of water vapor under specific conditions.

In accordance with the method of the present invention, a dielectric insulating polymer that serves as a substrate, is exposed to water vapor plasma treatment which renders the surface of the substrate, i.e. the polymer, receptive to organic surface reactions with grafting reactants that effectively tailor the physical and chemical properties of the polymer surface while maintaining desirable bulk characteristics.

More specifically, after treating the substrate with a water vapor containing plasma, the surface of the substrate contains increased amounts of hydroxyl and carboxyl functionalities created on the surface during the water vapor plasma treatment. The resulting reactive functionalities can be used as grafting sites. The grafting reactants used in accordance with the present invention comprise compositions of matter selected from the group consisting of an epoxy, an acid chloride, an isocyanate.

Generation of a water vapor plasma is commonly known in the art. A plasma is typically generated by providing a gas between an anode and a cathode between which an RF field is provided. An RF field causes the dissociation of the gas into charged and neutral free radical particles. In a water vapor plasma, water molecules may be dissociated into hydroxyl ions and protons. According to the invention, a substrate to be treated with the plasma is placed on either the anode or the cathode. Plasmas and the methods of generating plasmas are generally described in the *Encyclopedia of Chemical Technology*, Third Edition in the article entitled "Plasma Technology", Volume Supplement. The teaching contained within this article is incorporated herein by reference.

More specifically, the substrate polymer is treated at a temperature which may range from about ambient (20° C. to about 25° C.) up to the glass transition temperature or melting temperature of the polymer body being treated.

The preferred polymeric material to used in the present invention is a polyimide material which has a glass transition temperature above about 250° C. Other operating parameters which are employed in the process of this invention will include pressure which may range from superatmospheric, that is, up to about 5 atmospheres, down to subatmospheric pressures of about $10^{-8}$ Torr, preferably from about 50 militorr to about 300 militorr.

Electric power may be from various sources such as direct current (D.C.), alternating Current (A.C.), audio frequency (A.F.), intermediate frequency (I.F.), radio frequency (R.F.), microwave frequency, etc.

Power density which is employed is the electrical power per unit area and ranges from about $10^{-3}$ watts/cm$^3$ to about 1000 watts/cm$^3$. The power density is preferably from about $10^{-2}$ W/cm$^3$ to about $10^1$ W/cm$^3$.

The power which is employed may be obtained from any source of electrical energy, a specific example being a generator.

The treatment of the polymer body with a water vapor plasma is effected for a period of time which may range from about 0.1 minute up to about 1 hour or more in duration.

The time of treatment depends upon the other operating conditions including temperature, pressure and power, and will be for a period of time sufficient to treat the surface of the polymer until said surface possesses sufficient hydroxyl and carboxyl functionalities to be sufficiently reactive with the grafting composition.

It is contemplated within the scope of this invention that the reaction of the grafting reactant will occur within a relatively short period of time after the surface of the polymer body is treated with the water vapor plasma. If desired, the plasma treated polymer may be aged by exposure to the atmosphere for a period of time which may range up to about eight days or more in duration.

The process of the invention may be carried out in either an open or a closed system. For example, when a closed system is employed, the polymer material which is to be treated is placed in a closed chamber and water vapor is passed into the chamber. The chamber will be maintained at a predetermined operating condition of temperature and pressure, the operating parameters of which have been set forth above. Therefore, the chamber is subjected to a high electric field between two electrodes. A discharge is obtained, which is the water vapor plasma, consisting of ions, free radicals and metastable gas species. The plasma products are allowed to contact and treat the surface of the polymer for a predetermined period of time whereby the surface of said polymer is modified so that hydroxyl and carboxyl groups are formed. At the end of the reaction time the electric power is discontinued and the treated polymer body is removed.

It is also contemplated within the scope of this invention that the water vapor plasma treatment of the polymer may be effected in an open system in which the polymer to be treated is placed in an electric field between two electrodes and subjected to the electric field while water vapor is passed over and contacting the surface of the polymer body, said polymer being maintained at a predetermined operating temperature. Following the treatment of the polymer in an open system for a predetermined period of time, the modified polymer contains the hydroxyl and carboxyl groups ready for reaction with the reactive compositions set forth hereinafter.

The preferred polymers are selected from the following group: polyamides, polyesters, polyurethanes, polysiloxanes, phenolics, polysulfides, polyacetals, polyethylenes, polyisobutylenes, polyacrylonitriles, polyvinylchlorides, polystyrenes, polymethylmethacrylates, polyvinylacetates, polytetrafluoroethylenes, polyisoprenes, polycarbonates, polyethers, polyimides, polybenzimidazoles, polybenzoxazoles, polybenzothiazoles, polyoxadiazoles, polytriazoles, polyquinoxalines, polyimidazopyrrolones and copolymers containing an aromatic constituent and a constituent selected from a vinyl and cyclobutane group, wherein the aromatic constituent and the vinyl and cyclobutane groups contain at least one of the group is Si, Ge, Ti Zn and Fe as described in copending U.S. patent application Ser. No. 07/366,089 filed on Jun. 13, 1989 entitled "Dielectric Structures Having Embedded Therein Ga Filling RIE Etch Stop Polymer Materials of High Thermal Stability" to Babich et al., the teaching of which is incorporated herein by reference.

The more preferred polymers to be treated according to the present invention are polyaromatic polymers.

The more highly preferred polymers are polyaromatic polymers having a high glass transition temperature.

The most highly preferred polymers are polyimide type polymers. Polyimide polymers are described in the *Encyclopedia of Chemical Technology*, Third Edition in the article entitled "Polyimides" Volume 18, p. 704, the teaching of which is incorporated herein by reference.

Generally, the polyimides include the following recurring unit where the arrows indicate isomerism:

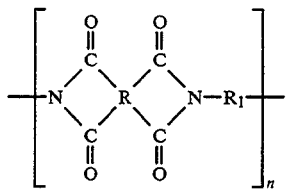

where n is an integer representing the number of repeating units to provide a molecular weight usually about 10,000 to about 100,000. R is at least one tetravalent organic radical selected from the group consisting of:

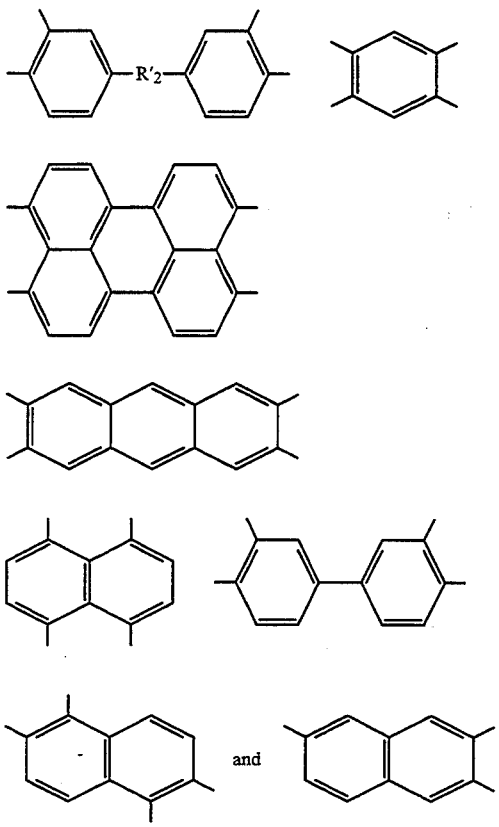

$R_2$ being selected from the group consisting of divalent aliphatic hydrocarbon radicals having from 1 to 4 carbon atoms and carbonyl, oxy, sulfo, sulfide, ether, siloxane, phosphine oxide, hexafluorioisopropylidene and sulfonyl radicals and in which $R_1$ is at least one divalent radical selected from the group consisting of an aliphatic organic radical or from the group shown:

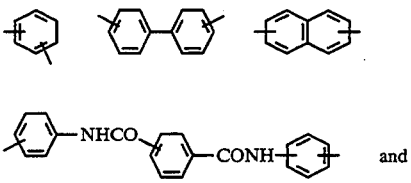

-continued

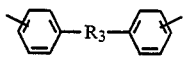

in which $R_3$ is a divalent organic radical selected from the group consisting of $R_2$, silico and amino radicals. Copolymers containing two or more R and/or $R_1$ radicals can be used.

Polyimides are available commercially from a variety of suppliers in one of three forms: a) as solutions of the polyamic acid precursors (e.g., DuPont Pyralin); b) as pre-imidized polyimide form (e.g., DuPont Kapton film); or c) as pre-imidized powders (e.g., Ciba-Geigy Matrimid 5218) or solutions (e.g., Ciba-Geigy Probimide). The chemistry of commercial polyimides includes examples of many of the components listed above, but a preferred polymer for use pursuant to the present invention is based on the monomers pyromellitic dianhydride (PMDA) and oxydianiline (ODA, also named 4,4'-diaminodiphenyl ether). Other preferred polymers for use pursuant to the present invention are the polymers of benzophenonetetracarboxylic dianhydride (BTDA) and ODA and/or 1,3-phenylenediamine and polymer of 3,3'-biphenylenediamine (PDA). Polyimide films based on PMDA-ODA are available from Allied Corporation under the tradename Apical and from DuPont under the tradename Kapton. Films based on biphenyldianhydride-phenylenediamine (BPDA-PDA) are available from UBE Corporation as Upilex and from Hitachi Chemical Company as PIQ-L100. Other tradename polyimides useful pursuant to the present invention include Durimid from Rogers Corporation and the DuPont Pyralin series, including PI-2545, PI-2540, PI-2555, PI-2556, PI-2563, PI-2560, PI-2525, PI-2570, PI-2566, PI-2575, PI-2576, PI-2574, PI-2580, PI-2701, PI-2702, PI-2703, PI-2610 and PI-2611.

Once the polymer substrate has been exposed to the water vapor plasma treatment, it is then contacted with a composition of matter selected from the group consisting of an acid chloride, an epoxy, an isocyanate. A diglycidyl compound is a preferred epoxy embodiment.

There are no special parameters that are necessary for the reactions with the aforementioned compositions to proceed as the polymer surface and the compositions noted are very reactive.

Suitable acid chlorides that can be utilized in accordance with the present invention are any acid chloride especially malonyl dichloride as well as para (cyano) benzoyl chloride and para (trifluoromethyl) benzoyl chloride.

After the initial water vapor plasma treatment, when an epoxy resin is grafted to the surface of the substrate, it has been determined that with the use a suitable anhydride reactant, in the presence of an catalyst such as an amine, the epoxy may be crosslinked. Suitable anhydrides to be reacted are nadic methyl anhydride, hexahydrophthalic anhydride, methyl tetrahydrophthalic anhydride, phthalic anhydride, maleic anhydride, noneyl succinic anhydride and succinic anhydride.

Diglycidyl ether compounds grafted onto the surface of the substrate can be used as an intermediate upon which subsequent grafted reactions may be executed. This allows the formation of virtually any desired surface layer with its associated properties and characteristics while leaving the bulk properties of the materials which the grafting has been accomplished to remain in tact.

Preferred isocyanate reactants are 2,4-tolylene diisocyanate, methylene bis(4-phenyl-isocyanate), and polymethylene polyphenylisocyanate. The compounds react with the —OH groups present on the surface of the polymer substrate to form a urethane—for example:

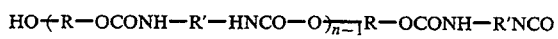

Polymerization can occur on the surface of the substrate due to the reactivity of the isocyanate group toward a variety of reactive groups such as —COOH and —NH$_2$ as well as H$_2$O.

For example water reacts with isocyanates to yield CO$_2$ and an amine.

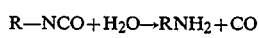

the amine the reacts further with the isocyanate groups

There is also dimerization to carbodiimides:

and trimerization:

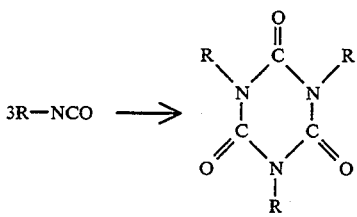

as well as several other types of side reactions may also be encountered.

There are compounds that are suitable for use in accordance with the present inventions that are essentially prepolymers as they are reacted with the reactive surface of the water vapor plasma treated substrate to form a reaction product that can be polymerized in a second step usually by the addition of a catalyst or other reactant.

The prepolymers are termed structoset prepolymers. The second-step reaction is usually a different one than the first-step reaction. These polymers as coatings on the substrate surface are highly advantageous because they generally offer greater control of the polymerization and crosslinking reactions, and very importantly, of the structure of the product.

Structoset prepolymers are low molecular weight polymers with various functionalities depending on the particular case. If the functional groups are located at the ends of the prepolymer chains the prepolymer is termed a structoterminal prepolymer. The prepolymer is a structopendant prepolymer if the functional groups are located along the polymer chain. The reactions of structoset prepolymers can be treated by the statistical approach to gelation by simply considering the prepolymers as reactants with their functionalities.

There are two major classes of prepolymers that can be used in accordance with the present invention. They are diol prepolymers and epoxy prepolymers.

Hydroxyl-terminated structoterminal polyethers, (H—OR—OH)$_n$ and polyesters. H-(-OCOR'-COOR-)$_n$OH, are used extensively as prepolymers in polyurethane technology. The polyethers are commonly synthesized from ethylene and propylene oxides and the polyesters from diacids in the presence of excess diols. These hydroxyl terminated prepolymers are reacted with excess diisocyanates to yield isocyanate terminated polymers, for example:

which can then be crosslinked in a variety of ways. These isocyanate terminated prepolymers may be reacted directly with the water vapor plasma treated surface.

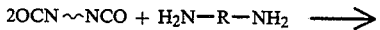

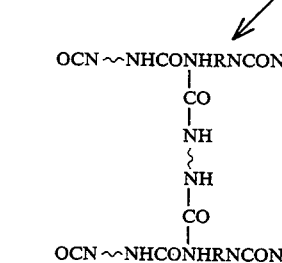

Thus the addition of a diamine forms urea linkages by reaction with the isocyanate end-groups which then crosslink by the formation of biuret linkages.

Epoxy prepolymers are commonly formed from 2,2-bis (4-hydroxyphenyl)propane (referred to as bisphenol A) and epichlorohydrin

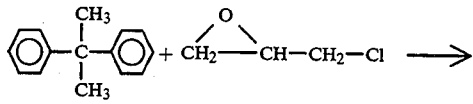

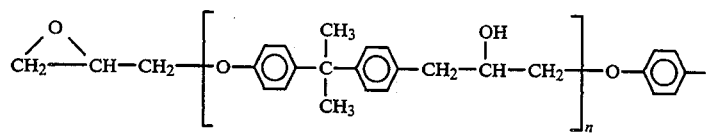

These are considered as structoterminal or structopendant prepolymers depending on whether crosslinking occurs through the epoxy end groups or the hydroxyl groups. Thus crosslinking occurs primarily through the hydroxyl groups when

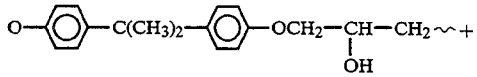

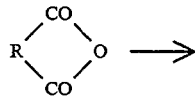

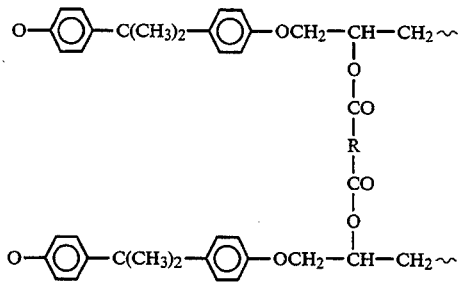

an anhydride (F=2) is used as the crosslinking agent and the epoxy prepolymer is considered a structopendant prepolymer. Phthalic anhydride is often used as the curing agent, although other anhydrides, including maleic anhydride and pyromellitic anhydride, and the other anhydrides mentioned above may be used in specialty applications. The prepolymer is a structoterminal prepolymer when polyamines are used for crosslinking. Crosslinking in this case involves the base-catalyzed opening of the epoxide groups

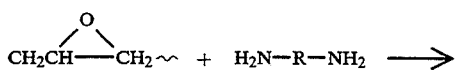

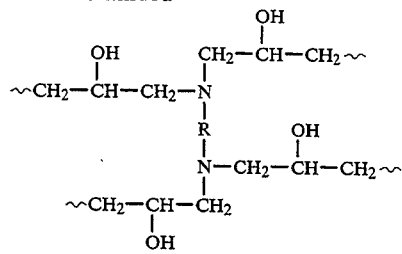

Both primary and secondary amines are used as crosslinking agents. Since each N-H bond is reactive in this process, primary and secondary amine functional groups have functionality (F) equal to 2 and 1 respectively. A variety of amines, including diethylene triamine (F=5), triethylene tetramine (F=6), and m-phenylenediamine (F=4) are used as crosslinking agents. Crosslinking through the epoxide groups can also be achieved through ring-opening polymerization using tertiary amines as initiators.

Other epoxy compounds suitable for use as the reactive composition with the treated polymer surface are:

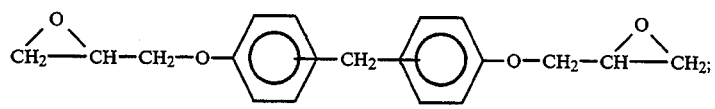

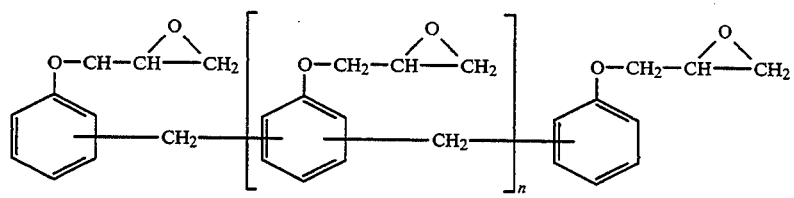

wherein the average value for n is between about 0.2 and 1.6 and the epoxy functionality is between about 2.2 and 3.6;

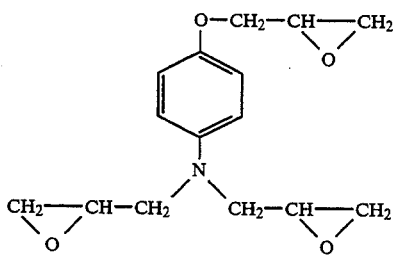

having a theoretical functionality of about 3.0;

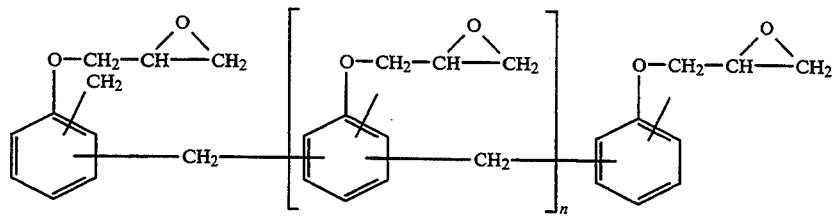

wherein the average value for n is between about 0.7 and 3.4 and the epoxy functionality is between about 2.7 and 5.4;

an alicyclic diepoxy carboxylate having the formula:

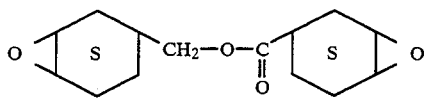

Also suitable are 1,4-butanediol diglycidyl ether, triglycidyl isocyanurate and N,N,N$^1$N$^1$-tetraglycidyl-4,4$^1$-methylenebisbenzenamine.

Other suitable epoxy compounds useful in the present invention are disclosed in *Handbook of Epoxy Resins*, Lee and Neville, McGraw Hill (1982), the contents of which are incorporated by reference herein. The sole requirement governing the use of any such compounds disclosed therein is that they be reactive with the water vapor plasma treated surface.

The following examples illustrate the process of the present invention.

EXAMPLE 1

This example described the method of treating substrates in accordance with the present invention. An MKS Type 1150A-SP003-88 Massflow meter for liquid vapor introduction was added to a plasma chamber. This manifold consists of a liquid reservoir and a variable leak valve. A positive shut-off valve isolates the entire manifold from the vacuum chamber. The manifold is wrapped with commercially available heater tape, and the temperature is controlled with a variable transformer.

Typical plasma operating parameters are: base pressure=0.1 to 1 microtorr, and the electrode temperature is about 25° C., the plasma pressure is from about 100 to 300 millitorr and RF power is about 50 watts.

In an attempt to elucidate the surface changes upon water vapor plasma treatment, polystyrene (average molecular weight=4,400,000, PDI=1.06) was water vapor plasma treated and examined. Water contact angle measurements using the sessile drop technique (0.05 ml advancing, 0.025 ml receding) revealed a significant change upon plasma treatment. The virgin polystyrene contact angles were measured to be 90° advancing and 80° receding. Water vapor plasma treated polystyrene contact angles were measured to be 3° advancing and less than one degree receding. Transmission FTIR spectroscopy of polystyrene films that were etched in water vapor plasma from an initial thickness of 400 A down to a final thickness of 90 A demonstrated new bands at 1000 cm$^{-1}$ and 1750 cm$^{-1}$ not present before plasma exposure. This is consistent with the idea of surface hydroxylation/carboxylation. Thus, after the plasma treatment, the substrate posesses reactive sites for capable of reacting further.

EXAMPLE 2

A PMDA-ODA polyimide sheet was prepared and was treated as set forth in Example 1 with the water vapor plasma. Following the treatment of the substrate with the water vapor plasma, it was determined that there are a plurality of grafting sites available on the surface thereof. The substrate was removed from the chamber, was formed into strips, and each strip was contacted with one of the following compositions of matter: an epoxy, an acid chloride, (melonyl dichloride) an isocyanate and a diglycidyl epoxy compound.

Successful grafting in each instance indicated by the observed change in sessile drop water contact angle. After the water vapor plasma treatment, the water contact angles were 19.5°±0.6° (50 microliter advancing drop) and 3.5°±0.6° (25 microliter receding drop). After reacting the malonyl dichloride with the surface, these angles were measured to be 62°±2° and 41°±2° respectively.

EXAMPLE 3

The substrate and procedure disclosed in Example 2 above was duplicated. To further demonstrate the surface reactivity, chlorotrimethyl silane reagent was used in the sessile drop water contact angle evaluation. The post-draft water contact angles of 66°±4° (50 microliter advancing drop) and 39°±3° (25 microliter receding drop) indicate successful grafting. This fact was confirmed with XPS and the appearance, after grafting of a silicone peak at 101.1 eD.

EXAMPLE 4

The substrate and procedure detailed in Example 2 above was followed with the exception that 4-cyano benzoyl chloride was used as the grafting reactant. Successful grafting was confirmed by contact angle and XPS.

EXAMPLE 5

The substrate and procedure detailed in Example 2 above was followed with the exception that 4-(trifluoromethyl) benzoyl chloride was used as the grafting reactant. Successful grafting was confirmed by contact angle and XPS.

EXAMPLE 6

The water vapor plasma treatment of the polyimide sheet detailed in Example 2 above was followed. Instead of using an acid chloride, a diglycidyl ether (Dow D,E,R, 667-bisphenol A-type resin; epoxide equivalent weight 1600–2000) dissolved in methyl isobutyl ketone was reacted with the water vapor plasma treated surface using N, N-dimethylbenzylamine as a catalyst. Successful grafting was observed by visual inspection and confirmed with contact angle measurement and by observation of palladium seeding and copper plating using a conventional electroless copper plating bath.

The epoxy layer on the surface of the polyimide results in a substrate having the desirable properties of polyimide which concurrently possessing the ability of epoxy polymers to become activated toward electroless copper deposition in the same manner as is documented in Horkans et al., *Electrochem, Soc.* 134, 300 (1987) and Kim et al., *IBM, Res. Dev.*, 28, 697 (1984).

EXAMPLE 7

Using the article prepared in Example 6, the epoxy resin containing surface was crosslinked by reacting same with nadic methyl anhydride using N, N-dimethylbenzylamine as a catalyst. This surface also metalized using the seed and plate process noted above.

The ramifications of a polyimide with the epoxy surface prepared in the examples above provides a product having the excellent bulk properties of polyimide coupled with the surface characteristics of an epoxy to allow for fabrication of a high performance polyimide base second level package with a manufacturing scheme that can be implemented in a transparent fashion to any epoxy based process scheme.

Having thus described our invention what we claim as new and desire to secure by Letters Patent is:

1. A method comprising treating a dielectric polymer selected from the group consisting of: polyamides, polyesters, polyurethanes, polysiloxanes, phenolics, polysulfides, polyacetals, polyethylenes, polyisobutylenes, polyacrylonitriles, polyvinylchlorides, polystyrenes, polymethylmethacrylates, polyvinylacetates, polytetrafluoroethylenes, polyisoprenes, polycarbonates, polyethers, polyimides, polybenzimidazoles, polybenzoxazoles, polybenzothiazoles, polyoxadiazoles, polytriazoles, polyquinoxalines, polyimidazopyrrolones and copolymers containing an aromatic constituent and a constituent selected from a vinyl and cyclobutane group, said constituents containing at least one of the group of Si, Ge, Ti, Zn and Fe, by exposing said dielectric polymer to a water vapor plasma wherein said water vapor containing plasma is generated in an electric field from an electric power of from about $10^{-3}$ watts/cm$^3$ to about 1000 watts/cm$^3$ at a temperature of from about ambient to about the glass transition temperature of said treated polymer body and a pressure in the range from about $10^{-6}$ atmospheres to about 5 atmospheres for a period of time ranging from about 0.1 minute to about 1 hour, to form reactive sites on the surface of said dielectric polymer;

contacting said treated dielectric polymer surface with a composition of matter selected from the group consisting of an epoxy compound, an acid chloride, an isocyanate, or prepolymers of said epoxy compound, said acid chloride or said isocyanate, said composition reacting with said reactive sites to graft said composition of matter thereon and forming a reaction product thereon.

2. The method defined in claim 1, wherein the epoxy resin is diglycidyl ether.

3. The method defined in claim 1, wherein said epoxy resin has an epoxide equivalent weight between about 1600 and 2000 and is dissolved in methyl isobutyl ketone and a reaction occurs in the presence of N,N-dimethylbenzylamine catalyst.

4. The method defined in claim 3, wherein said reaction product is further reacted by contacting it with a cyclic anhydride.

5. The method described in claim 4, wherein said reaction product is reacted further by contacting it with nadic methyl anhydride.

6. The method described in claim 4, wherein said reaction product is reacted further by contacting it with hexahydrophthalic anhydride.

7. The method described in claim 4, wherein said reaction product is reacted further by contacting it with methyl tetrahydrophthalic anhydride.

8. The method described in claim 4, wherein said reaction product is reacted further by contacting it with phthalic anhydride.

9. The method described in claim 4, wherein said reaction product is reacted further by contacting it with maleic anhydride.

10. The method described in claim 4, wherein said reaction product is reacted further by contacting it with noneyl succinic anhydride.

11. The method described in claim 4, wherein said reaction product is reacted further by contacting it with succinic anhydride.

12. The method defined in claim 1, wherein said composition of matter is an acid chloride.

13. The method defined in claim 12, wherein said composition of matter is malonyl dichloride.

14. The method defined in claim 12, wherein said composition of matter is 4-(cyano)benzoyl chloride.

15. The method defined in claim 12, wherein said composition of matter is 4-(trifluoromethyl) benzoylchloride.

16. The method defined in claim 1 wherein said composition of matter is an isocyanate.

17. The method defined in claim 16, wherein said composition of matter is 2 4-tolylene diisocyanate.

18. The method defined in claim 16, wherein said composition of matter is methylene bis(4-phenylisocyanate).

19. The method defined in claim 16, wherein said composition of matter is polyphenylisocyanate.

20. The method defined in claim 1, wherein said composition of matter is a prepolymer that is a structoset prepolymer.

21. The method defined in claim 20, wherein said structoset prepolymer is a structoterminal prepolymer.

22. The method defined in claim 2, wherein said structoset prepolymer is a structopendant prepolymer.

23. The method defined in claim 1, wherein said composition of matter is:

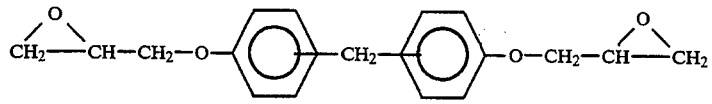

24. The method defined in claim 1, wherein said composition of matter is:

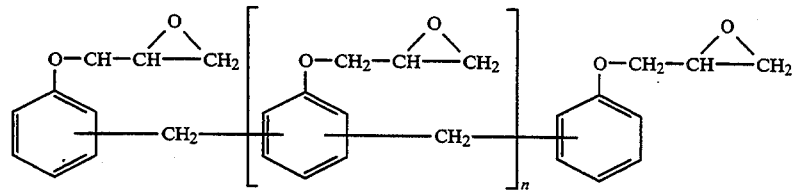

wherein the average value for n is between about 0.2 and 1.6 and the epoxy functionality is between about 2.2 and 3.6.

25. The method defined in claim 1, wherein said composition of matter is 1,4-butanediol diglycidyl ether.

26. The method defined in claim 1, wherein said composition of matter is triglycidyl isocyanurate.

27. The method defined in claim 1, wherein said composition of matter is N,N,N¹,N¹-tetraglycidyl-4,4¹-methylenebisbenzenamine.

28. The method defined in claim 1, wherein said composition of matter is:

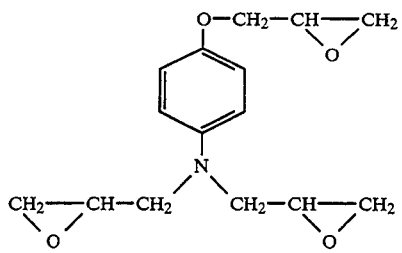

having a theoretical functionality of about 3.0.

29. The method defined in claim 20, wherein said composition of matter is:

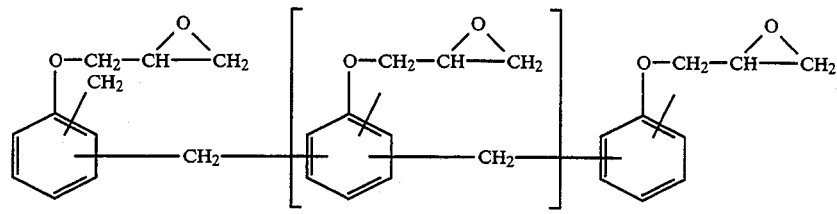

wherein the average value for n is between about 0.7 and 3.4 and the epoxy functionality is between about 2.7 and 5.4.

30. The method defined in claim 1, wherein said composition of matter is an alicylic diepoxy carboxylate having the formula:

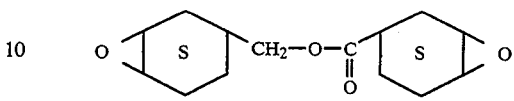

31. The method defined in claim 1 wherein said polymer is polyimide.

32. The method defined in claim 31 wherein said polyimide is the reaction product of PMDA and ODA.

33. The method defined in claim 32 wherein said acid chloride is malonyl dichloride.

34. The method defined in claim 3 wherein said polymer is polyimide.

35. The method defined in claim 31 wherein said polyimide is the reaction product of BPDA and PDA.

* * * * *